United States Patent
Terra Rios et al.

(10) Patent No.: US 10,298,742 B2
(45) Date of Patent: May 21, 2019

(54) TRANSFERRING INFORMATION FROM A SENDER TO A RECIPIENT DURING A TELEPHONE CALL UNDER NOISY ENVIRONMENT

(71) Applicant: SONY MOBILE COMMUNICATIONS INC., Tokyo (JP)

(72) Inventors: Rodrigo Terra Rios, Malmö (SE); Håkan Nygren, Lund (SE); Mathias Jensen, Malmö (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/455,633

(22) Filed: Mar. 10, 2017

(65) Prior Publication Data

US 2017/0264735 A1    Sep. 14, 2017

(30) Foreign Application Priority Data

Mar. 11, 2016    (EP) .................................... 16159890

(51) Int. Cl.
| | | |
|---|---|---|
| *H04M 3/42* | (2006.01) | |
| *H04M 1/725* | (2006.01) | |
| *G06F 17/28* | (2006.01) | |
| *H04M 3/533* | (2006.01) | |
| *H04W 4/14* | (2009.01) | |

(Continued)

(52) U.S. Cl.
CPC ...... *H04M 1/72569* (2013.01); *G06F 17/289* (2013.01); *H04M 3/42382* (2013.01);
(Continued)

(58) Field of Classification Search
CPC ......... H04M 1/72569; H04M 2201/40; H04M 1/72591; H04M 19/044; H04M 1/271;
(Continued)

(56) References Cited

U.S. PATENT DOCUMENTS

2003/0081739 A1*    5/2003    Hikishima .......... H04M 1/6058
                                                     379/88.01
2004/0092252 A1*    5/2004    Gustavsson ......... H04M 3/4281
                                                     455/412.2
(Continued)

FOREIGN PATENT DOCUMENTS

WO    2014/086424 A1    6/2014

OTHER PUBLICATIONS

European Search report dated Aug. 24, 2016 for corresponding European application No. 16159890.9.

*Primary Examiner* — Quoc Thai N Vu
(74) *Attorney, Agent, or Firm* — Renner Otto Boisselle and Sklar

(57) ABSTRACT

A method for transferring information from a sender to a recipient during a telephone call between a sender communication apparatus and a recipient communication apparatus is provided. The method comprises detecting, by the recipient communication apparatus, that the recipient is subjected to a noisy environment; converting a voice message, originating from the senders voice and recorded by the sender communication apparatus, into a text message; and displaying, at a display of the recipient communication apparatus, the text message to the recipient.

14 Claims, 2 Drawing Sheets

(51) Int. Cl.
*H04W 4/16* (2009.01)
*H04M 7/00* (2006.01)
*G10L 15/26* (2006.01)

(52) U.S. Cl.
CPC ......... *H04M 3/533* (2013.01); *H04M 7/0042* (2013.01); *H04W 4/14* (2013.01); *H04W 4/16* (2013.01); *G10L 15/265* (2013.01); *H04M 2201/40* (2013.01); *H04M 2203/4536* (2013.01); *H04M 2242/12* (2013.01)

(58) Field of Classification Search
CPC . H04M 2242/12; H04M 3/533; G06F 17/289; G10L 15/26; G10L 13/00; G10L 13/043; G10L 15/20; G10L 21/0216; G10L 15/005; G10L 15/265; H04W 4/14; H04W 4/16; H04W 4/003
See application file for complete search history.

(56) References Cited

U.S. PATENT DOCUMENTS

| | | | |
|---|---|---|---|
| 2005/0266829 A1* | 12/2005 | Tran | H04M 3/537 455/412.1 |
| 2006/0217159 A1* | 9/2006 | Watson | H04M 1/72522 455/563 |
| 2007/0140471 A1* | 6/2007 | Gutta | H04M 1/6016 379/392.01 |
| 2014/0181673 A1* | 6/2014 | Work | G06F 3/0484 715/729 |
| 2015/0317975 A1* | 11/2015 | Ruiz Rodriguez | H04M 3/533 704/235 |
| 2015/0379982 A1* | 12/2015 | Paquier | H04M 1/72552 704/260 |
| 2018/0268838 A1* | 9/2018 | Faubel | G06F 3/01 |

* cited by examiner

TRANSFERRING INFORMATION FROM A SENDER TO A RECIPIENT DURING A TELEPHONE CALL UNDER NOISY ENVIRONMENT

TECHNICAL FIELD

The present invention relates to a method for transferring information from a sender to a recipient during a telephone call between a sender communication apparatus and a recipient communication apparatus. The present invention relates to communication apparatus arranged to perform the method.

BACKGROUND

Having a phone call between two or more call participants may encounter various problems. For example, during a telephone call one participant might have perfect signal on its telephone but still be subjective to a noisy environment. One solution to this problem is to by various methods improve the volume of the sound emitted by the telephone of the participant being in the noisy environment. However, this solution is not sufficient for some situations. Moreover, this solution might in the long run inflict damage to the hear ability of the participant.

SUMMARY OF THE INVENTION

Hence, there is a need for improvements in connection with receiving a telephone call at a noisy environment.

It is an object to at least partly address the problem discussed above.

According to a first aspect a method for transferring information from a sender to a recipient during a telephone call between a sender communication apparatus and a recipient communication apparatus is provided. The method comprises detecting, by the recipient communication apparatus, that the recipient is subjected to a noisy environment; converting a voice message, originating from the senders voice and recorded by the sender communication apparatus, into a text message; and displaying, at a display of the recipient communication apparatus, the text message to the recipient.

By detecting that the recipient communication apparatus is in a noisy environment and converting the voice message of the sender into text to be presented to the recipient increased quality of the information transmitted during the telephone call is achieved. Moreover, the activation of voice to text conversion may be performed without the need of sender integration or approval. Furthermore, the activation of voice to text may be made dynamic based on the noise level of the environment.

The act of detecting may comprise comparing a measured noise level with a predetermined threshold noise level.

The act of detecting may comprise activation of a button, switch or slider on the recipient communication device.

The act of detecting may comprise determining if an expression expressed by the recipient and recorded by the recipient communication device belongs to a predefined set of expressions related to the recipient's inability to hear or understand spoken information during the telephone call.

The act of detecting may comprise determining if the recipient is repeatedly putting the recipient communication device to the ear of the recipient.

The method may further comprise indicating by sound and/or vibration, induced at the recipient communication device, that the act of converting is initiated. A simple but yet effective way of making the recipient aware of the voice to text has been activated is provided.

The method may further comprise playing, at a loudspeaker of the recipient communication apparatus, the voice message to the recipient. By both displaying the text message and playing the voice message increased quality of the information transmitted during the telephone call is achieved.

The method may further comprise detecting a language spoken by the caller; and translating the text message into another language than the language spoken by the caller.

The act of converting may be performed in the recipient communication apparatus. A method wherein all acts may be performed in a single communication apparatus is hereby provided. This simplifies the communication in the telephone communication link. Moreover, this makes it possible for implementing the method even in the case of the sender communication device does not have the ability to perform voice to text conversion.

The act of converting may be performed in the sender communication apparatus. The risk of losing data in the radio communication between the communication apparatuses is limited.

According to a second aspect a non-transitory computer-readable recording medium is provided. The non-transitory computer-readable recording medium having recorded thereon a program which when executed on a communication apparatus having processing capabilities is arranged for implementing embodiments of the method.

The program may be an application downloadable to the communication apparatus via an application providing service.

The above mentioned features of the method, when applicable, apply to this second aspect as well. In order to avoid undue repetition, reference is made to the above.

According to a third aspect communication apparatus is provided. The communication apparatus comprises a radio module configured to establish a telephone call with another communication apparatus; a noise detecting module configured to detect if the communication apparatus is located in a noisy environment; a voice to text converting module configured to, in response to the communication apparatus being located in a noisy environment, convert an incoming voice message during a telephone call into a text message; and a display configured to display the text message.

The noise detecting module may be at least one from the group of noise detecting modules comprising a noise level determining module configured to determine if a measured noise level is above a predetermined threshold, a button, switch or slider configured to the activated by a user of the communication apparatus, a voice interpreter configured to determine if an expression expressed by a user of the communication device belongs to a predefined set of expressions related to the users inability to hear or understand spoken information during the telephone call, a near ear detector detecting that the user repeatedly puts the communication device to the ear of the user.

The communication apparatus may further comprise a loudspeaker wherein the loudspeaker is configured to play the incoming voice message simultaneously as the display is displaying the text message.

The above mentioned features of the method, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "an apparatus" or "the apparatus" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

Various examples will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

As will be appreciated by one skilled in the art, aspects may be embodied as an apparatus, method or computer program product. Accordingly, aspects may take the form of an entirely hardware embodiment, an entirely software embodiment (including firmware, resident software, microcode, etc.) or an embodiment combining software and hardware. Furthermore, various examples may take the form of a computer program product embodied in one or more computer readable medium(s) having computer readable program code embodied thereon.

Figure 1:
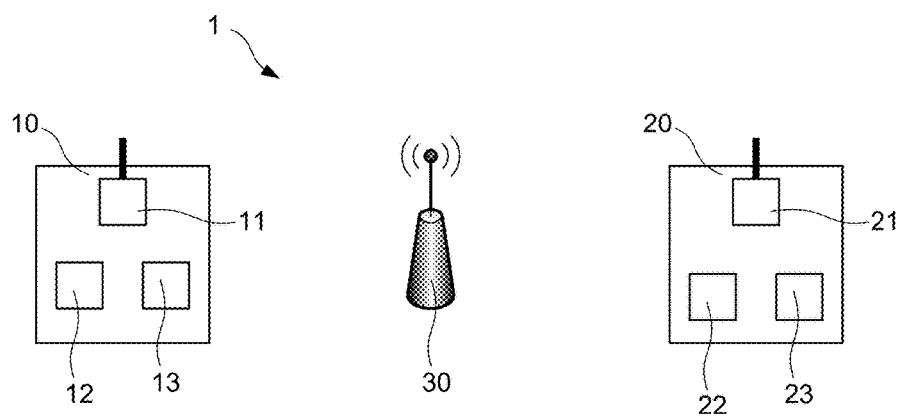
FIG. 1 illustrates a communication system.

FIG. 1 illustrates a communication system 1. The communication system 1 comprises a sender communication apparatus 10, a recipient communication apparatus 20 and a base station 30. The sender communication apparatus 10 comprises a radio module 11, a microphone 12 and a loudspeaker 13. The recipient communication apparatus 20 comprises a radio module 21 a microphone 22 and a loudspeaker 23.

The sender and/or recipient communication apparatus 10, 20 may be a stand-alone communication apparatus, such as a mobile phone, a laptop, a smart watch or a tablet comprising a radio module. Alternatively, the sender and/or recipient communication apparatus may be an aggregate of interconnected personal communication devices. In this context a personal communication device shall be construed as device configured to communicate with one or more other personal communication devices within a personal area network. Typically the personal area network is a wireless personal area network, WPAN, carried over a wireless network technology such as INSTEON, IrDA, Wireless USB, Bluetooth, Z-Wave or ZigBee. The reach of a WPAN varies from a few centimeters to a few meters. A non-limiting example of an aggregate of interconnected personal communication devices is an aggregate comprising a mobile phone and a headset, the mobile phone and the headset being interconnected via Bluetooth. Another non-limiting example of an aggregate of interconnected personal communication devices is an aggregate comprising a mobile phone and a smart watch, the mobile phone and the smart watch being interconnected via Wireless USB.

A telephone call may be established between the sender communication apparatus 10 and the recipient communication apparatus 20. In this context a telephone call shall be construed as a telephone communication link established between the sender communication apparatus 10 and the recipient communication apparatus 20. The telephone communication link may be established directly between the sender communication apparatus 10 and the recipient communication apparatus 20. Alternatively, the telephone communication link may be established via the base station 30. The radio module 11 of the sender communication apparatus 10 is configured to establish a telephone communication link with the radio module 21 of the recipient communication apparatus 20. Alternatively, the radio module 21 of the recipient communication apparatus 20 is configured to establish a telephone communication link with the radio module 11 of the sender communication apparatus 10. The telephone communication link may be a wireless telephone communication link, a wired communication link or a combination thereof. The wireless telephone communication link may be established using any known wireless telephone technology. As non-limiting examples 3G-, 4G- or 5G-mobile telecommunications technology, or any IP-protocol over WiFi may be used. The wired telephone communication link may be established using any known wired technology.

During a telephone call, a voice message, originating from the voice of a user of the sender communication apparatus 10, is recorded by the microphone 12 of the sender communication apparatus 10. The user of the sender communication apparatus 10 will in the continuing be referred to as the sender. During a telephone call the voice message is then typically sent to the recipient communication apparatus 20 to be played by the loudspeaker 23 of the recipient communication apparatus 20. However, as has been discussed above in the background section sometimes the user of the recipient communication apparatus 20 will have difficulties to hear the played voice message due to being subjected to a noisy environment. The user of the recipient communication apparatus 20 will in the continuing be referred to as the recipient.

Figure 2:
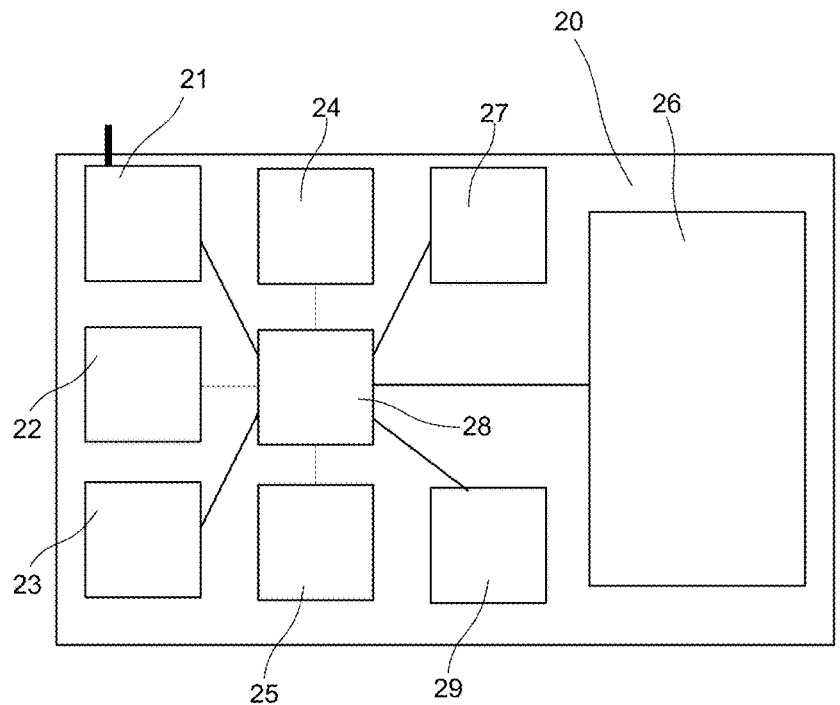
FIG. 2 is a block view a recipient communication apparatus.

FIG. 2 illustrates a more detailed view of a recipient communication apparatus 20 according to embodiments. In addition to the radio module 21, the microphone 22 and the loudspeaker 23, the recipient communication apparatus 20 further comprises a noise detecting module 24, a voice to text converting module 25, a display 26, a processor 28 and a memory 29.

The radio module 21 is configured to establish a telephone call with another communication apparatus, e.g. the sender communication apparatus 10.

The noise detecting module 24 is configured to detect if the communication apparatus is located in a noisy environment. In this context noisy environment shall be construed as an environment where the sound level is above a predetermined threshold. According to embodiments the sound level shall be above the predetermined threshold for a predetermined time in order for the environment to be considered as being noisy. According to embodiments the environment is considered as being noisy as long as the sound level is above the predetermined threshold. The noise detecting module 24 may be embodied in many different ways. The noise detecting module 24 may be implemented in hardware, in software or in a combination thereof.

As a non-limiting example, the noise detecting module 24 may be a noise level determining module configured to determine if a measured noise level is above a predetermined threshold. The noise level may be measured by means of the microphone 22 of the recipient communication apparatus. IN this context, the noise level determining module may be configured to detect if the communication apparatus is located in a noisy environment by utilizing data from a background noise reduction algorithm. Typically, background noise reduction is performed by taking advantage of that the microphone 22 of the recipient communication apparatus 20 comprises a primary microphone and a secondary microphone. The primary microphone is aimed to the recipient's mouth to record the voice of the recipient, whilst also picking up any noise from the surrounding environment. The secondary microphone is located elsewhere, typically on the back of the recipient communication apparatus and does not pick up so much speech but mainly noise from the surrounding environment. By comparing the signals from the primary and secondary microphones the noise level of the surrounding environment may be established.

Alternatively or in combination, the noise detecting module 24 may be a button, switch or slider configured to the activated by a recipient. The button, switch or slider may be implemented as a virtual button, switch or slider on a touch display of the recipient communication device. The button, switch or slider may be implemented as a physical button, switch or slider. The recipient may thus simply activate the button, switch or slider upon being subjected for the noisy environment.

Alternatively or in combination, the noise detecting module 24 may be a voice interpreter configured to determine if an expression expressed by the recipient and recorded by the microphone 22 of the recipient communication apparatus belongs to a predefined set of expressions related to the recipient's inability to hear or understand spoken information during the telephone call. Non-limiting examples of expression belonging to the predefined set of expressions are "what did you say", "I did not hear you", "what" and "please, repeat".

Alternatively or in combination, the noise detecting module 24 may be implemented as determining how often a near ear detector is activated. Detecting that the recipient repeatedly puts the recipient communication device 20 to her ear indicates that the recipient has problems hearing the voice message. Thus, this may be indicative that the recipient communication apparatus 20 being located in a noisy environment.

The voice to text converting module 25 is configured to convert an, during the telephone call, incoming voice message into a text message. The voice to text converting module 25 is configured to convert the incoming voice message in response to the recipient communication apparatus 20 being located in a noisy environment. The voice to text converting module 25 may be embodied in many different ways. The voice to text converting module 25 may be implemented in hardware, in software or in a combination thereof. According to a non-limiting example, the voice to text converting module 25 is implementing the T.140 protocol for multimedia application text conversation.

The display 26 is configured to display the text message. The display 26 may further be configured to display an activation message indicating that a conversion mode has been activated. In this context the conversion mode shall be construed as a mode in which the voice to text conversion is active. According to embodiments just as been discussed above the voice to text conversion may be performed in the recipient communication apparatus. However, according to embodiments the voice to text conversion may also or in combination be performed in the sender communication apparatus, see below.

The loudspeaker 23 may be configured to play the incoming voice message simultaneously as the display 26 is displaying the text message. In this context simultaneously shall be construed as that the receiver of the voice and text messages shall regard the messages to be presented to him at the same time. According to a non-limiting example, simultaneously may be construed as within a time delay that is less than 100 ms, preferably less than 50 ms, more preferably less than 10 ms.

The loudspeaker 23 may further be configured to play an activation message indicating that the conversion mode has been activated. Such a played activation message may be a beep or the like. The playing of the activation message may be in addition to the activation message displayed by the display. The playing of the activation message may be instead of displaying the activation message on the display.

Alternatively or in combination, indication of entering into conversion mode may be performed using a tactile module 27 of the recipient communication apparatus. The tactile module 27 is configured to provide the recipient with tactile feedback. Hence, the entering into conversion mode may be indicated using vibration.

The processor 27 is arranged to perform a variety of acts or processes. Especially the processor 27 may arranged to perform any of the acts, fully or in part, mentioned above or below in case the act is implemented in software. For example, the processor 27 may be constituting a part of or fully the noise detecting module 24 and/or the text converting module 25. The processor 27 may comprise a single processing unit or multiple processing units. In case of multiple processing units each processing unit may be specialized in performing one or more acts of processing.

The memory 28 is arranged to buffer and or store data being processed by the processor 27. The memory 28 may comprise a single memory or a plurality of different memories. In case of a plurality of memories each memory may be specialized in storing one or more kind of data.

Alternatively or in combination, the recipient communication apparatus 20 may be configured to receive the from the voice message into the text message converted text message over the telephone communication link. If so, the conversion of the voice message into the text message may be performed by a voice to text converting module (not shown) of the sender communication apparatus 10. Alternatively or in combination, the conversion of the voice message into the text message may be performed by a voice to text converting module (not shown) of the base station 30 or the like used in establishing the telephone communication link. In case of receiving an already converted text message the text message may be generated according to the T.140 protocol for multimedia application text conversation. The text message may then be sent using Text over IP, ToIP. The ToIP is designed around the ITU-T T.140 real-time text presentation layer protocol (defined for H.32× multimedia services). T.140 allows real-time editing of text e.g. by using 'backspace' and retyping. T.140 is based on the ISO 10646-1 character set that is used by most IP text specifications and uses the UTF-8 format. Transport of ToIP uses the same Real-time Transport Protocol (RTP) as VoIP and Video-over-IP. The text is encoded according to IETF RFC 4103 "RTP Payload for Text Conversation". ToIP is a means of providing a real-time text service that operates over IP-based networks. It complements Voice over IP (VoIP) and Video over IP.

Figure 3:
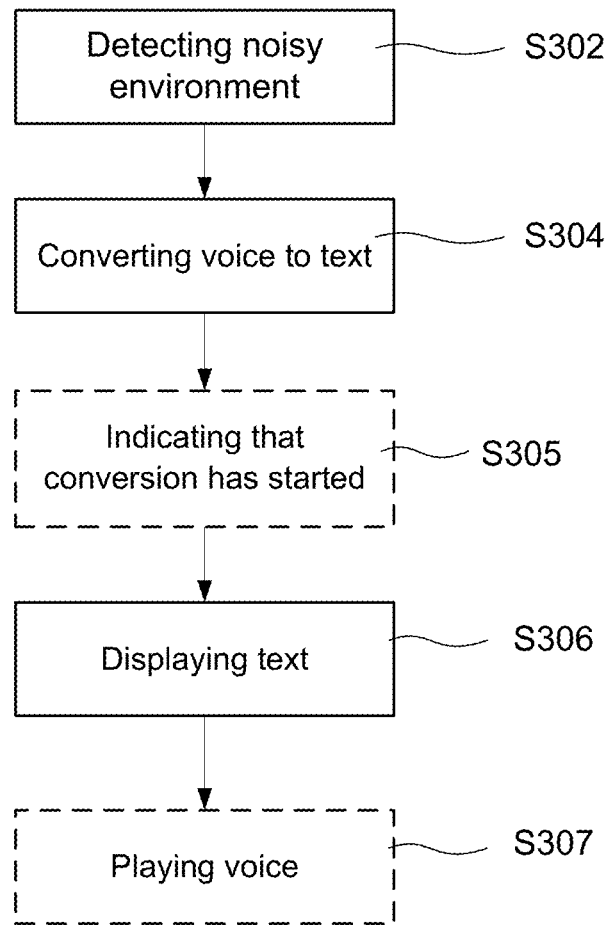
FIG. 3 is a block scheme of a method for transferring information from a sender to a recipient during a telephone call between a sender communication apparatus and a recipient communication apparatus.

With reference to FIG. 3 a method for transferring information from the sender to the recipient during a telephone call between the sender communication apparatus 10 and the recipient communication apparatus 20 will be discussed. The method comprises the following acts:

Detecting S302 that the recipient is subjected to a noisy environment. The detecting S302 is performed by the recipient communication apparatus. The detecting S302 may comprise comparing a measured noise level with a predetermined threshold noise level. Alternatively or in combination the detecting S302 may comprise activation of a button, switch or slider on the recipient communication device. Alternatively or in combination the detecting S302 may comprise determining if an expression expressed by the recipient and recorded by the recipient communication device belongs to a predefined set of expressions related to the recipient's inability to hear or understand spoken information during the telephone call. Alternatively or in combination the detecting S302 may comprise determining if the recipient is repeatedly putting the recipient communication device to the ear of the recipient.

Converting S304 a voice message, originating from the senders voice and recorded by the sender communication apparatus, into a text message. The converting S304 may be performed by the recipient communication apparatus 20. Alternatively, the converting S304 may be performed by the sender communication apparatus 10.

Displaying S306 the text message to the recipient. The displaying S306 is performed at a display 26 of the recipient communication apparatus 20.

The method may further comprise the act of indicating S305 that the act of converting is initiated. The indicating S305 may be made by sound and/or vibration induced at the recipient communication device 20.

The method may further comprise the act of playing S307, at a loudspeaker of the recipient communication apparatus, the voice message to the recipient.

The person skilled in the art realizes that the present invention by no means is limited to the preferred embodiments described above. On the contrary, many modifications and variations are possible within the scope of the appended claims.

For example, the method may further comprise detecting a language spoken by the caller; and translating the text message into another language than the language spoken by the caller.

The recipient may respond by voice during the telephone call.

Additionally, variations to the disclosed embodiments can be understood and effected by the skilled person in practicing the claimed invention, from a study of the drawings, the disclosure, and the appended claims.

The invention claimed is:

1. A method comprising:
    detecting, by a recipient communication apparatus of a recipient, that the recipient is subjected to a noisy environment, wherein the act of detecting comprises determining that an expression expressed by the recipient and recorded by a microphone of the recipient communication device belongs to a predefined set of expressions related to the recipient's inability to hear or understand spoken information during the telephone call;
    converting a voice message, originating from a sender's voice and recorded by a sender communication apparatus of the sender, into a text message;
    indicating by at least one of sound or vibration, induced at the recipient communication device, that the act of converting is initiated; and
    displaying, at a display of the recipient communication apparatus, the text message to the recipient.

2. The method of claim 1, wherein the act of detecting comprises comparing a measured noise level with a predetermined threshold noise level.

3. The method of claim 1, wherein the act of detecting comprises activation of a button, switch or slider on the recipient communication device.

4. A method comprising:
    detecting, by a recipient communication apparatus of a recipient, that the recipient is subjected to a noisy environment;
    converting a voice message, originating from a sender's voice and recorded by a sender communication apparatus of the sender, into a text message;
    indicating by at least one of sound or vibration, induced at the recipient communication device, that the act of converting is initiated; and
    displaying, at a display of the recipient communication apparatus, the text message to the recipient, wherein the act of detecting comprises determining if the recipient is repeatedly putting the recipient communication device to the ear of the recipient.

5. The method of claim 1, further comprising playing, at a loudspeaker of the recipient communication apparatus, the voice message to the recipient.

6. The method of claim 1, further comprising:
    detecting a language spoken by the caller; and
    translating the text message into another language than the language spoken by the caller.

7. The method of claim 1, wherein the act of converting is performed in the recipient communication apparatus.

8. The method of claim 1, wherein the act of converting is performed in the sender communication apparatus.

9. The method of claim 1, wherein said detecting is executed during a telephone call between the sender communication apparatus and the recipient communication apparatus.

10. A non-transitory computer-readable recording medium having recorded thereon a program which when executed on a communication apparatus having processing capabilities is arranged for implementing the method of claim 1.

11. The non-transitory computer-readable recording medium according to claim 10, wherein the program is an application downloadable to the communication apparatus via an application providing service.

12. A communication apparatus comprising:

a radio circuit configured to establish a telephone call with another communication apparatus;

a noise detecting circuit configured to detect if the communication apparatus is located in a noisy environment based on an expression expressed by a user and recorded by a microphone of the communication apparatus belonging to a predefined set of expressions related to the user's inability to hear or understand spoken information during the telephone call;

a voice to text converting circuit configured to, in response to the communication apparatus being located in a noisy environment, convert an incoming voice message during a telephone call into a text message;

a notification device configured to indicate by at least one of sound or vibration, induced at the recipient communication device, that the act of converting is initiated; and a display configured to display the text message.

13. The communication apparatus according to claim 12, wherein the noise detecting circuit is at least one from the group of noise detecting circuits comprising a noise level determining circuit configured to determine if a measured noise level is above a predetermined threshold, a button, switch or slider configured to the activated by a user of the communication apparatus, a voice interpreter configured to determine if an expression expressed by a user of the communication device belongs to a predefined set of expressions related to the users inability to hear or understand spoken information during the telephone call, a near ear detector detecting that the user repeatedly puts the communication device to the ear of the user.

14. The communication apparatus according to claim 12, further comprising a loudspeaker wherein the loudspeaker is configured to play the incoming voice message simultaneously as the display is displaying the text message.

* * * * *